Jan. 24, 1967   P. J. JENKINS   3,300,029
CONVEYORS
Filed April 14, 1965   3 Sheets-Sheet 2
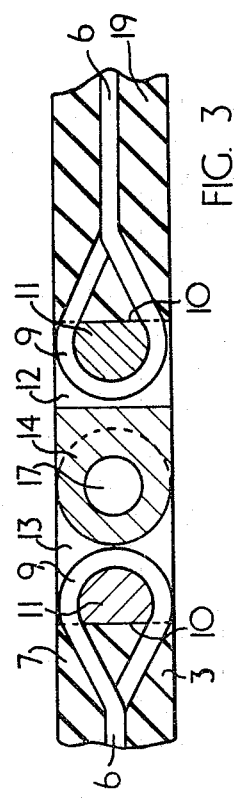
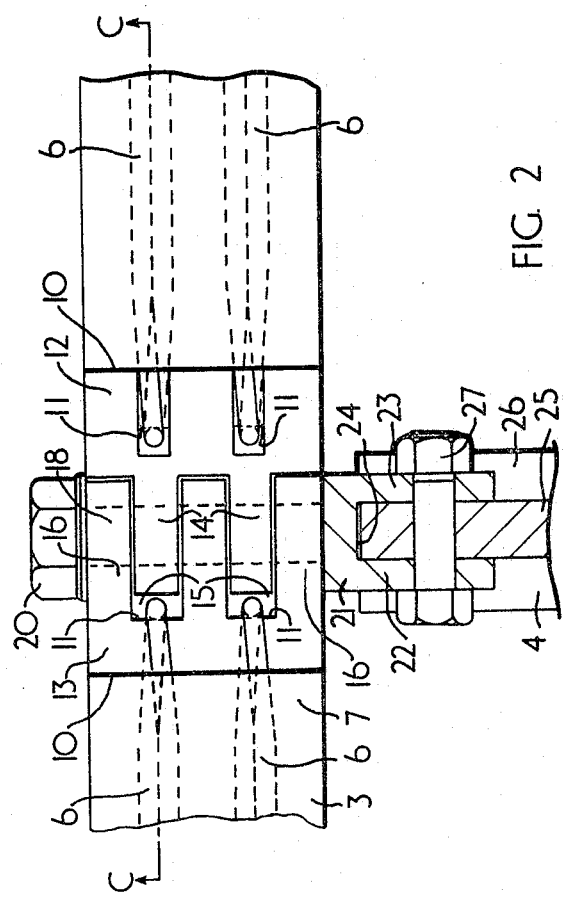
Inventor
Peter J. Jenkins
Attorneys Jan. 24, 1967  P. J. JENKINS  3,300,029
CONVEYORS
Filed April 14, 1965  3 Sheets-Sheet 3
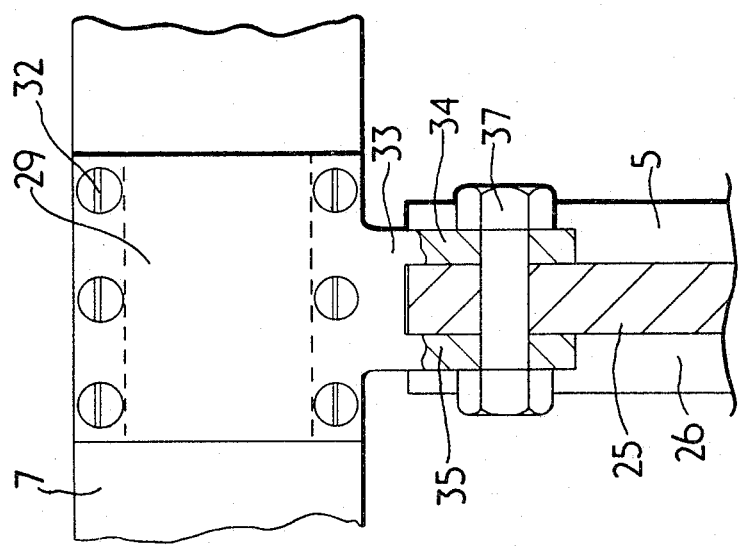
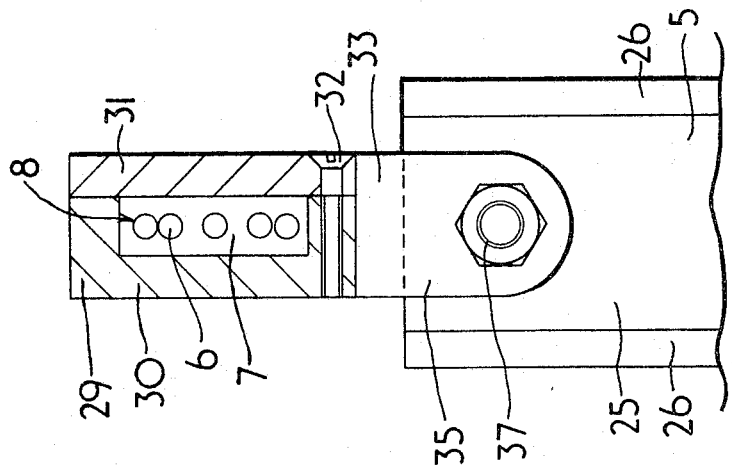
Inventor
Peter J. Jenkins
Stevens, Davis, Miller & Mosher
Attorneys 3,300,029
CONVEYORS
Peter J. Jenkins, Burscough, England, assignor to Dunlop Rubber Company Limited, London, England, a British company
Filed Apr. 14, 1965, Ser. No. 448,180
Claims priority, application Great Britain, May 2, 1964, 18,330/64
8 Claims. (Cl. 198—168)

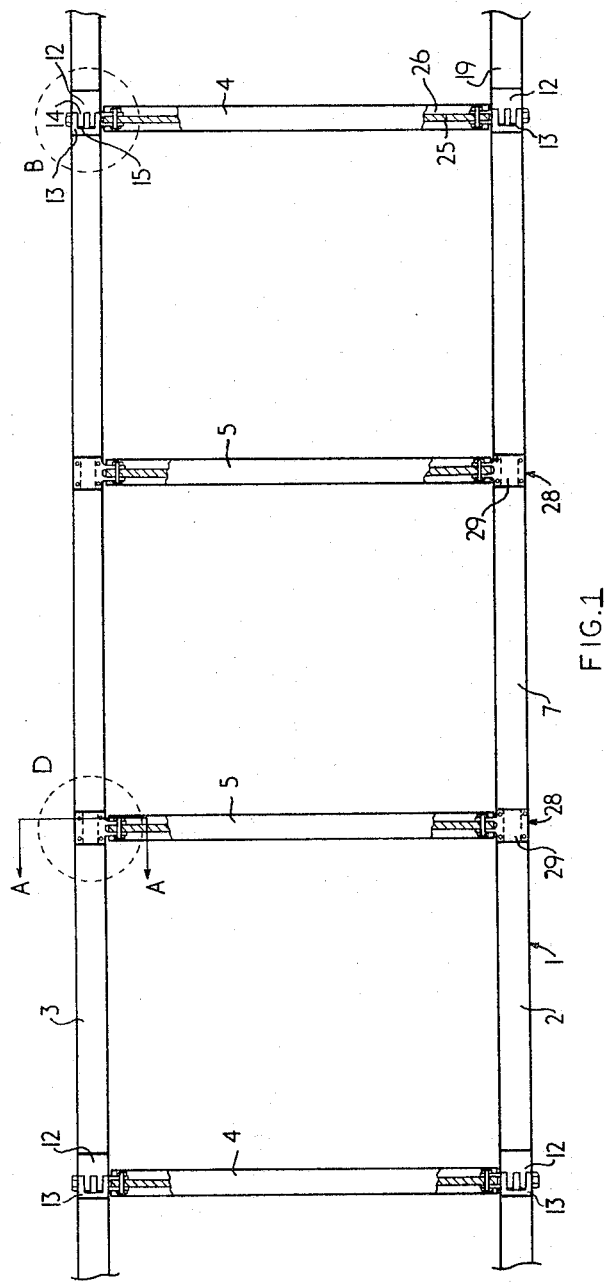

This invention relates to conveyors of the type known as scraper conveyors. A scraper conveyor comprises a series of transverse scraper members and longitudinal members to which the scraper members are attached. Normally the longitudinal members are drivable and the scraper members are arranged to be movable relative to a load supporting surface. A load to be conveyed is placed on the load supporting surface and conveyed across the surface by movement of the scraper bars.

According to the present invention a scraper conveyor comprises a series of transverse scraper members and longitudinal members to which the scraper members are attached wherein the longitudinal members comprise substantially inextensible metal cables embedded in a flexible polymeric composition. Preferably the polymeric composition is a rubber composition or a synthetic resin composition.

Normally the driven longitudinal members are formed by a series of side units joined end to end by suitable joining means. One subdivision of the scraper conveyor may suitably comprise a pair of side units in spaced side by side relationship having scraper members in the form of bars extending from one side unit to the other. For example a scraper bar may be attached to each side unit at the end of the unit and other scraper bars may be attached at intermediate positions along the unit. In one embodiment of the invention scraper bars are attached at two intermediate positions. The scraper bars are normally substantially at right angles to the side units.

Each side unit includes a length of substantially inextensible metal cable. In a preferred embodiment of the invention the cable is present as a flattened helix, the windings being preferably in close side by side relationship in a single plane in the central portion of each side unit. The strength of the side unit is determined by the number of windings in the helix and by the diameter and construction of the cable.

In an alternative embodiment of the invention, the cable is present as a number of individual lengths. Each end of the cable may be turned into a loop. A collar may be swaged into position to fix the configuration of the loop.

In a third embodiment of the invention the cables may be in the form of endless loops or grommets, the number of such loops being determined by the strength and number of the wires from which they are constructed.

The loops may be restricted to form an eye at each end of each section. This may be accomplished by the closing of a collar around the two strands of the loop.

The joining means employed for joining the side units end to end may be any suitable means which result in a joint at least as strong as the side units themselves. In one suitable form of joining means, lugs on the end of one side unit cooperate with slot-defining members on the end of the following side unit. The lugs and slot-defining members are provided with alignable holes in which a pin may be seated to effect the joint. The lugs and slot-defining members may suitably be provided as part of metal components at the ends of the side units. For example two lugs may be provided as part of the metal component on one end of a side unit and two slots may be provided as part of the metal component on the other end of the side unit.

If the cable in the side unit is present as a helix, the metal component may be anchored in the windings of the helix at the ends of the unit. If the cable is present as a number of individual lengths the metal component may be held by loops on the ends of the lengths of cable.

The cable is preferably steel cable. Suitable steel cable has a diameter in the range of 0.125 inch to 0.75 inch, particularly about 0.25 inch.

The cable is embedded in a covering composition which may be any suitable natural or synthetic rubber composition or a synthetic resin composition. Among suitable synthetic rubber compositions are compositions of polyurethanes, styrene-butadiene copolymers, ethylenepropylene copolymers and terpolymers, butyl rubber, neoprene, or butadiene/acrylonitrile copolymers. Among suitable synthetic resin compositions are compositions of polyvinyl chloride, which may also be included in mixed compositions with butadiene/acrylonitrile copolymers.

The cable is preferably treated either by plating or by painting with a bonding agent so as to increase adhesion between the cable and the covering composition. Adequate adhesion is particularly desirable when the cable is present as a helix in order to prevent unwinding of the coils under load.

The scraper bars may be of the conventional type which are of steel and may conform to National Coal Board specification P155/1958, Item 7. The scraper bars may be attached to the ends of the side units by attachment means associated with the joining means between two side units. The scraper bars may be attached at intermediate positions along a side unit by other means such as clamping means locatable in a reduced thickness portion of the unit.

A scraper conveyor in accordance with the present invention has substantial advantages over scraper conveyors in which the longitudinal members consist of chains. Such chains are excessively noisy, and the rate of wear and stretch in the chains is very high. It is necessary on occasion to remove the chains completely from the installation in order to match them up for length. These disadvantages are overcome by the present invention.

One form of scraper conveyor in accordance with the invention comprises a series of subdivisions 9 feet long having a transverse scraper bar at each end of the subdivision and two scraper bars at equispaced intermediate positions along the side units which form the longitudinal members in the subdivision. The longitudinal members are driven by conventional means such as friction drive, or by means of a short subsidiary belt or chain conveyor having projections upon its surface so arranged as to engage behind the scraper bars of the main conveyor and thereby cause them to be propelled forward by the forward movement of the subsidiary conveyor. The assembly moves in a channel-section steel pan, the base of which provides a load supporting surface.

One embodiment of the invention is illustrated by way of example in the accompanying drawings in which:
FIGURE 1 is a partly cross-sectioned plan of a subdivision of a scraper conveyor in accordance with the FIGURE 2 is a partly cross-sectioned enlarged view of the area of FIGURE 1 included within circle B.

FIGURE 3 is a cross-section along the line C–C' of FIGURE 2.

FIGURE 4 is a partly cross-sectioned enlarged view of the area of FIGURE 1 included within the circle D.

FIGURE 5 is a cross-section along the line A–A' of FIGURE 1.

As shown in the drawing a subdivision 1 of a scraper conveyor comprises a pair of side units 2, 3 having a transverse scraper bar 4 at each end of the section and two scraper bars 5 at equispaced intermediate positions along the side units.

The side units each comprise a flattened helix of substantially inextensible steel cable 6 embedded in a natural rubber composition 7. The steel cable has been suitably pretreated by plating with zinc or brass. The covering composition has a width of about 3 inches and a depth of about 1½ inches. The helix consists of slightly less than 2½ windings of cable flattened so that five lengths of cable lie side by side in parallel relationship in one approximately horizontal plane for the greater part of the length of the side unit as shown at 8 in FIGURE 5. At each end of the side unit two loops 9 are formed by two lengths of the cable turning through 180° to form two adjacent lengths. The loops are evenly curved and lie about an approximately vertical plane. About half of the length of each loop extends beyond the end 10 of the covering composition and engages a boss 11 on a metal component 12, 13. One metal component is provided at each end of the side unit so that each metal component 12, 13 has two bosses. In the usual method of manufacture the cable is threaded around the bosses of the metal components during formation of the helix.

One type of metal component 12 has two lugs 14 having rounded ends and a second type of metal component 13 has two slots 15 having rounded recess faces. The lugs 14 of one type are engageable in the slots 15 of the other type. The lugs 14 and the forked portions 16 of the metal components defining the slots are penetrated by transverse holes 17 which become aligned when the lugs are engaged in the slots. Through these aligned holes a pin 18 may be passed to hold the lugs in position in the slots.

A metal component of one type is provided on one end of the side unit and a metal component of the second type is provided on the adjacent end of a side unit of a further subdivision 9 of the conveyor. The pin 18 holding the lugs in the slots thus effects the joint between two side units. This pin is threaded at one end to receive a locking nut 20 and provided at the other end with a broadened extension 21 which is forked into forked portions 22, 23 which defines a slot 24 perpendicular to the side unit. This slot is engageable with a scraper bar 4 of conventional type which is of steel to National Coal Board specification, p. 155/1958, Item 7. The scraper bar is of generally I-shaped cross-section having a web portion 25 and two cross portions 26. The web portion 25 fits in the slot 24. The forked portions 22, 23 and the web portion 25 are penetrated by apertures which receive a retaining bolt 27.

Attachment positions 28 for the intermediate scraper bars 5 are also provided at two evenly spaced positions along the side unit. The width and depth of the cover composition 7 on the side unit is reduced at these positions 28 and a metal fitting 29 consisting of a channel-shaped portion 30 and a plate portion 31 is fitted around the side unit, the two portions being bolted together in position by bolts 32. The metal portion lies flush with the cover on either side of the attachment position and is held from sliding along the side unit by the cover composition 7. The fitting 29 has an extension 33 to one side which is forked into forked portions 34, 35 which defines a slot 36 perpendicular to the side unit. This slot is engageable with the web portion 25 of a scraper bar 5. The forked portions 34, 35 and the web portion 25 are penetrated by apertures to receive a retaining bolt 37.

In alternative embodiments of the invention the following features may be included.

The steel cable may be passed through a collar close to the point where the loops are formed and this collar swaged into position to offer mechanical resistance to the unwinding of the helix under load.

The metal components may have internally threaded holes and the pin may have external threads so that the pin may be seated in the holes and the locking nut may be dispensed with.

At the attachment positions, U-section metal plates may be bonded into the side units. The arms of the U-section assist in the location of the attachment means.

The thickness and depth of the covering composition may be reduced in the portion of the side units lying between the ends and the intermediate attachment positions so as to increase the flexibility of the assembly and save a substantial quantity of the covering composition.

Although the side units described above are of rectangular cross-section it is possible to use side units of triangular cross-section. In this case the apex portion of the triangle may suitably point horizontally inwardly towards the centre line of the conveyor, the cap of the apex portion being removed. This shape assists in overcoming a tendency of lumps of the material being conveyed becoming trapped between the side of the channel-section steel pan and the moving side unit.

A polyurethane composition may be used for higher abrasion resistance instead of a natural rubber composition. Although it is preferred to use cable having a percentage extensibility of less than 3% it is possible to use cable having a percentage extensibility up to about 5%.

Having now described my invention, what I claim is:

1. A segmental scraper conveyor assembly comprising a plurality of transverse scraper members; a pair of segmental longitudinal members between which the scraper members are attached, said longitudinal members being in spaced parallel relationship, and each segment thereof having at least one metal cable embedded in a flexible polymeric composition and extending longitudinally throughout the length of each segment, each cable having at least one loop at each end of each longitudinal segment; and a metal component formed on each end of said longitudinal segments to join adjacent segments, the metal components of adjacent longitudinal segments being complementary and being hinged together, each metal component engaging at least one of said loops of the metal cable of its corresponding longitudinal segment at a position spaced longitudinally from the axis about which the metal component is hinged.

2. A segmental scraper conveyor according to claim 1, in which the metal components of adjacent longitudinal segments are complementary, one having lugs and the other cooperating slot-defining members, said lugs and slot-defining members having alignable holes in which a pin may be seated to effect the hinge joint.

3. A segmental scraper conveyor according to claim 2, in which each metal component has a boss spaced longitudinally from said alignable holes, said boss being anchored in the loop of the corresponding metal cable.

4. A segmental scraper conveyor according to claim 3, in which the boss on each metal component is in alignment with the boss on the complementary metal component on a line which is perpendicular to the axis about which said metal components are hinged.

5. A segmental scraper conveyor according to claim 1, in which said loops in said metal cable extend beyond the end of the flexible polymeric composition of each longitudinal segment.

6. A segmental scraper conveyor according to claim 1, wherein said cables are arranged in a sinuous configuration.

7. A segmental scraper conveyor according to claim 1, wherein said polymeric composition is rubber.

8. A segmental scraper conveyor according to claim 1, wherein said polymeric composition is resin.

References Cited by the Examiner

UNITED STATES PATENTS

| | | | |
|---|---|---|---|
| 1,427,856 | 9/1922 | Rutz | 24—33 X |
| 2,195,796 | 4/1940 | Currie | 198—168 |
| 3,212,627 | 10/1965 | Beebee | 198—193 |

ANDRES H. NIELSEN, *Primary Examiner.*

EDWARD A. SROKA, *Examiner.*